Nov. 29, 1955   C. W. BRANDON ET AL   2,725,027
MULTIPLE UNIT BARGE HULL CONSTRUCTION
Filed Nov. 21, 1951   5 Sheets-Sheet 1

Clarence W. Brandon
Harry Marlow
James E. Steele  INVENTORS.

BY *Clarence A. O'Brien*
*and Harvey B. Jacobson*
Attorneys

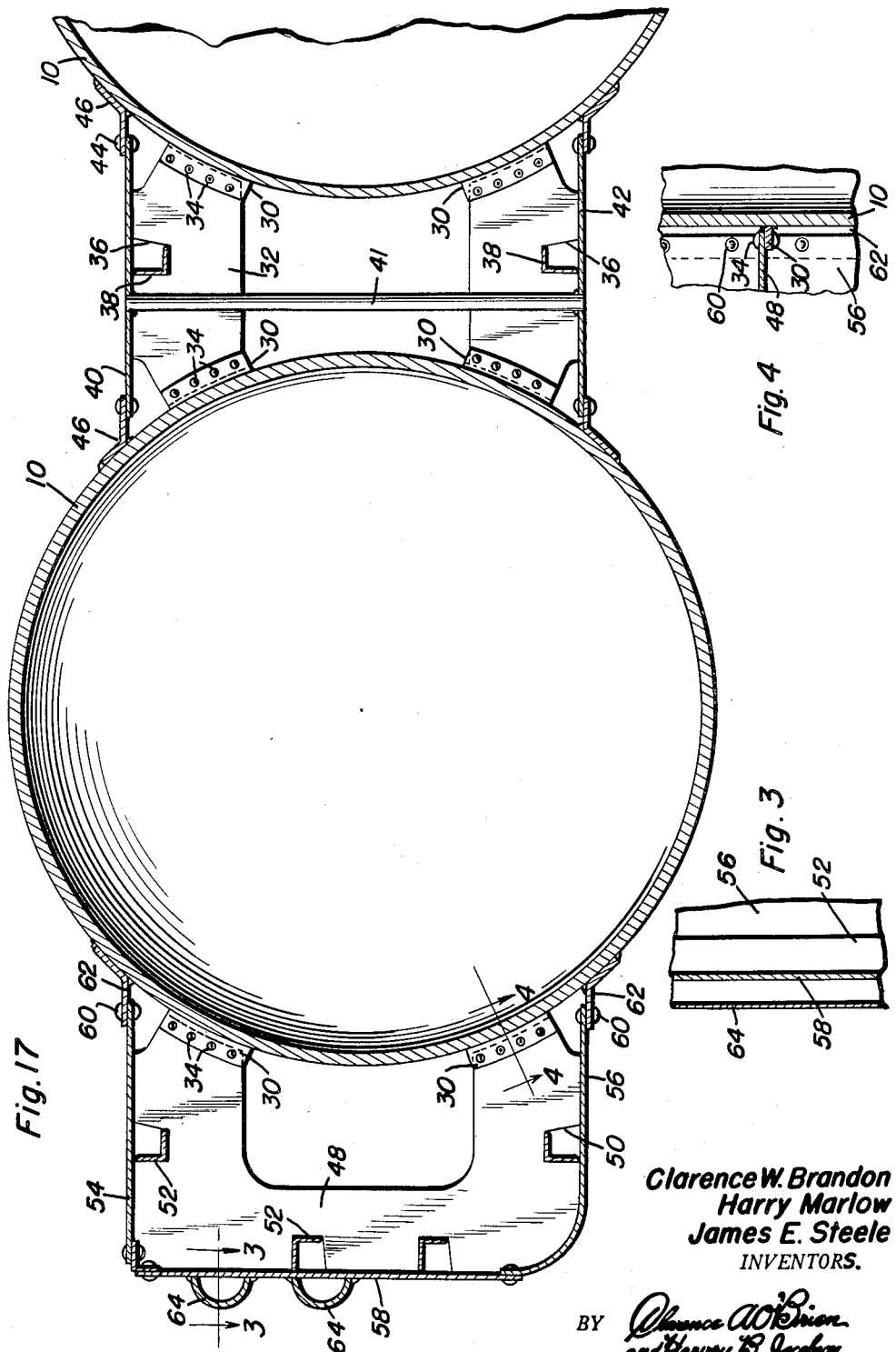

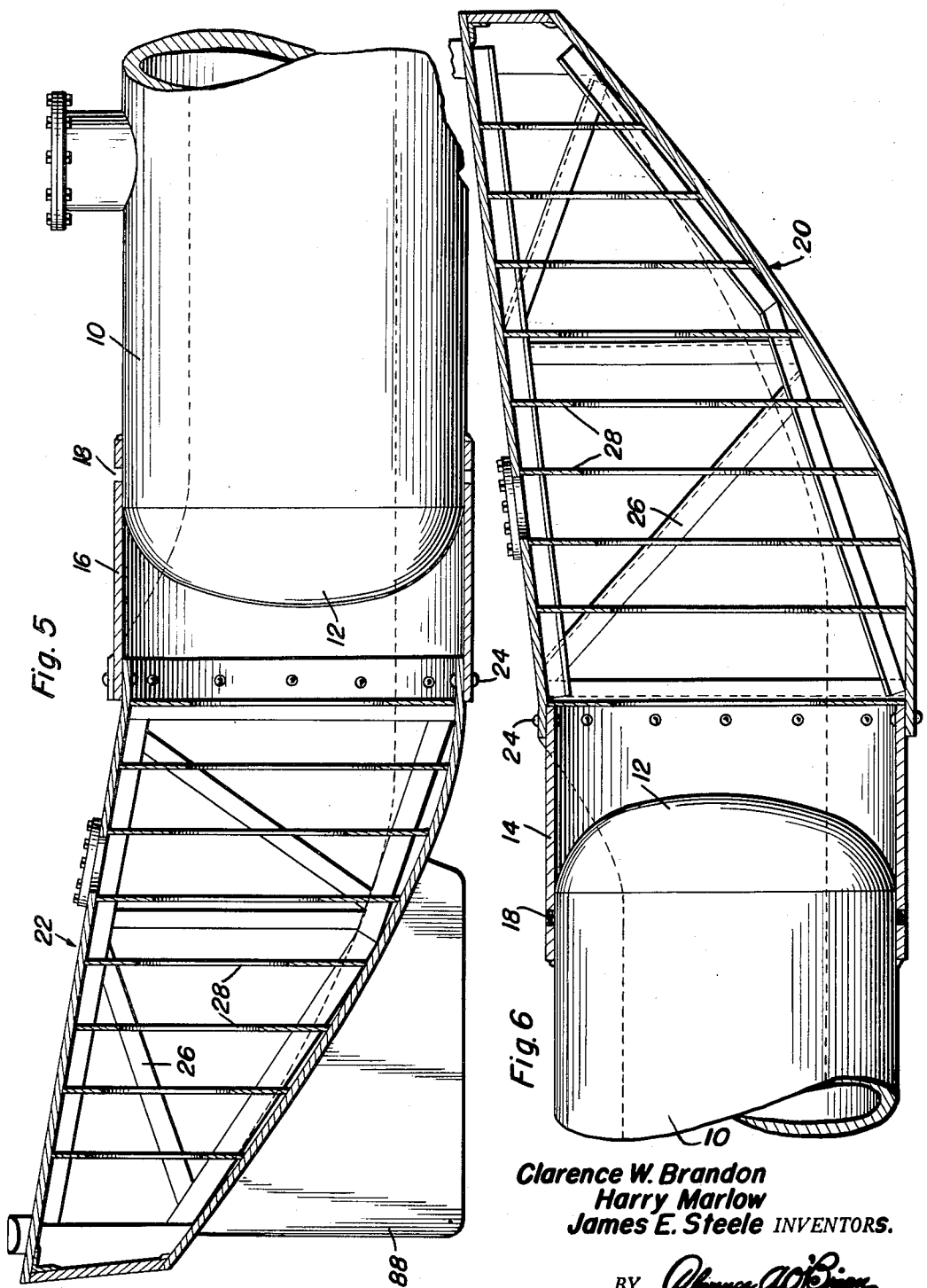

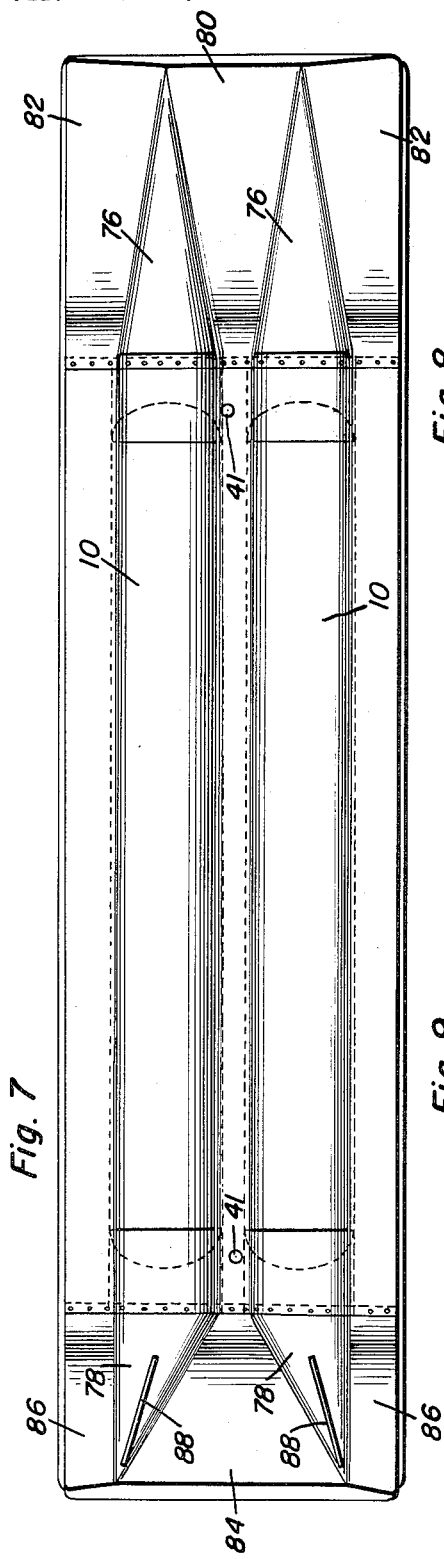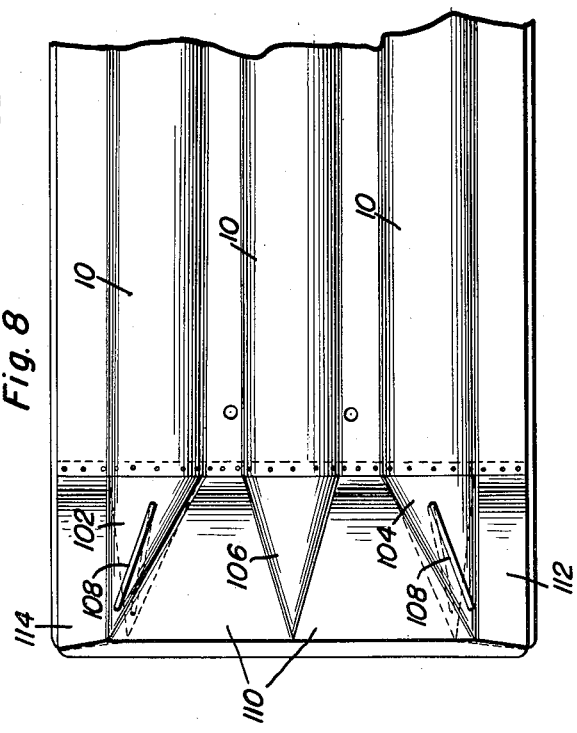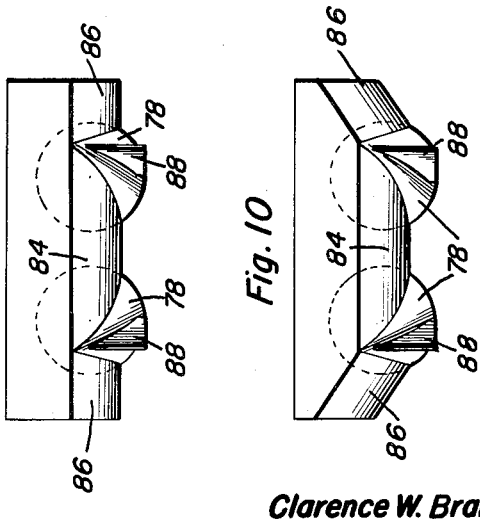

Nov. 29, 1955 C. W. BRANDON ET AL 2,725,027
MULTIPLE UNIT BARGE HULL CONSTRUCTION
Filed Nov. 21, 1951

Clarence W. Brandon
Harry Marlow
James E. Steele
INVENTORS.

BY Clarence A. O'Brien
and Harvey B. Jackson
Attorneys

United States Patent Office 2,725,027
Patented Nov. 29, 1955

2,725,027

MULTIPLE UNIT BARGE HULL CONSTRUCTION

Clarence W. Brandon, Tallahassee, Fla., and Harry Marlow and James E. Steele, Beaumont, Tex.; said Marlow and said Steele assignors to H. H. & N. A. Hardin Company, a partnership of Georgia Application November 21, 1951, Serial No. 257,494

7 Claims. (Cl. 114—74)

This invention comprises novel and useful improvements in a multiple unit barge and more specifically appertains to a barge specifically adapted for transporting such volatile liquids as propane, butane, ammonia and the like; and constitutes subject matter which is similar to and constitutes in some respects an improvement over the invention set forth in the co-pending application of Clarence W. Brandon, Serial No. 74,546, filed February 4, 1949, for Multiple Unit Barge.

The primary general objects of this invention are to improve the construction of barges by increasing the strength and the life of service of the same; decrease the material and expense required for constructing a barge; and facilitate and decrease the cost of replacing or repairing components of a barge.

More specifically, the principal objects of this invention are to provide an improved construction of fastening means for rigidly but detachably uniting various tank units together to form a barge; to provide improved means for securing an expansion tank upon such a barge; and to provide an improved construction of a prow and stern assembly for such a barge together with improved means for detachably securing the same upon the tank units of the barge.

An additional very important object is to improve the construction of barges to enable the advantageous employment of stress relieving of welded joints in existing furnaces by forming all welded joints upon separate sections of the barge which are of sufficient dimension to be accommodated within the capacities of conventional furnaces and thereafter mechanically assembling the sections into the complete barge.

Still further important objects of this invention are to provide prow and stern elements which may be prefabricated or constructed in situ and are removably secured to the tank units of a barge; to provide prow and stern units which may be specifically designed to produce selected variations in the trim of a barge during navigation and/or may vary the characteristics of the steering of the barge while the same is being towed or in traveling under its own power, and will strengthen and rigidify the assembly of tank units and may otherwise be efficacious in varying the characteristics of navigability of a barge.

Yet another purpose of the invention is to provide a construction of barge which will, without unduly limiting the over-all dimensions of the barge, enable the fabrication of subassemblies whose size will fall within the capacities of transportation by train, in the holds of ships and the like whereby the subassemblies may be fabricated at diverse locations.

These, together with various ancillary objects and features of the invention, which will later become apparent as the following description proceeds, are attained by this invention, preferred embodiments of which have been illustrated, by way of example only, in the accompanying drawings, wherein:

Figure 3 is a fragmentary detail view, taken substantially upon the horizontal plane indicated by the section line 3—3 of Figure 17;

Figure 4 is a further fragmentary sectional detail view taken substantially upon the plane indicated by the section line 4—4 of Figure 17;

Figure 5 is a fragmentary view, partly in elevation and partly in vertical longitudinal section showing the aft portion of the barge with the stern assembly and the manner of attaching the same to the barge;

Figure 6 is a fragmentary view of the fore portion of a barge, parts being shown in section and parts in elevation of a prow assembly and the manner of attaching the same to the barge;

Figure 7 is a bottom plan view of the barge in Figures 1 and 2;

Figure 8 is a view similar to Figure 7, but showing in bottom plan the modified form of barge similar to that of Figures 1–7;

Figures 9 and 10 are rear elevational views of the barge construction of Figures 1–7 but showing modified constructions thereof;

Figure 17 is a vertical transverse sectional view through the barge of Figures 1–7 showing the manner in which the tank units are detachably secured to each other in a rigid assembly to form the hull of the barge.

Figure 1:
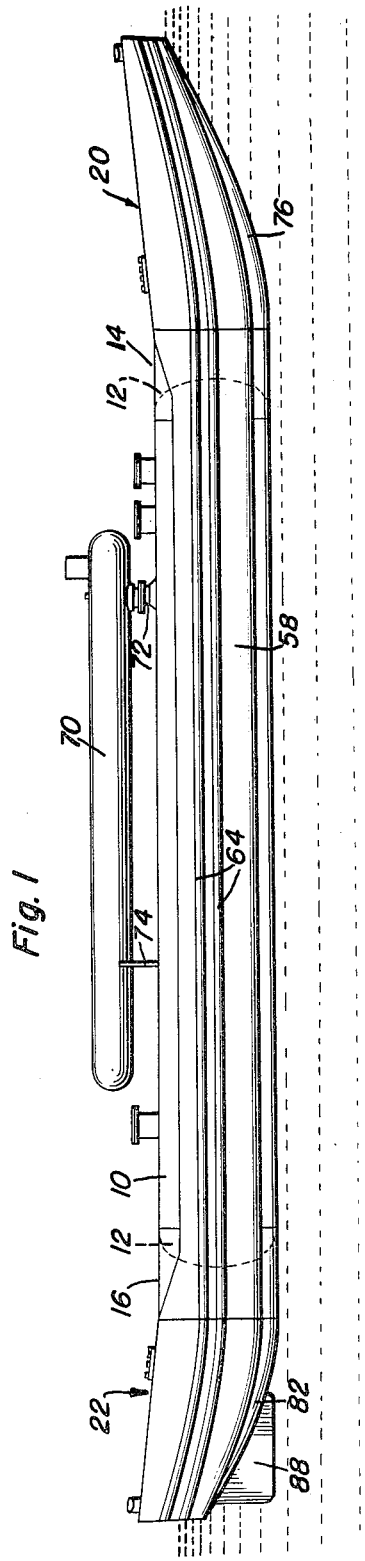
Figure 1 is a side elevational view of one construction of barge incorporating therein the principles of this invention, the barge being illustrated in loaded condition ready for navigation.

The present invention relates to certain specific improvements in the construction of barges for transporting volatile liquid cargoes such as butane, propane, ammonia and the like and of the type fully set forth and claimed in the various co-pending applications of Clarence W. Brandon, Serial Nos. 74,546, filed February 4, 1949; 269,791, filed February 4, 1952; 228,654, filed May 28, 1951. One type of barge set forth in said applications consists of a plurality of rigidly united tanks or containers constituting receptacles for receiving and transporting the volatile liquid cargo of the barge, said tanks constituting components of the hull of the barge and having prow and stern assemblies secured thereto to render the barge navigable.

The invention herein set forth and claimed consists of a novel means for securely but removably fastening the prow and stern assemblies to the ends of the cargo tanks, constituting elements of the hull of the barge, in a manner which will reinforce and strengthen the ends of said tanks. Still further, the present invention includes an improved manner for mounting an expansion or overflow tank upon the upper surface of the barge for receiving the overflow of the volatile liquid cargo of the tanks as the volume of the same is increased by the inflow of heat from the sun's rays and the like. Still another feature of this invention relates to a prow and stern construction for use in the foregoing type of barge which will enable the designer to obtain a barge construction having various characteristics of trim, navigation and steering or maneuvering.

In the embodiment of barge shown in Figures 1–7 and 17, there is illustrated a pair of tanks 10 disposed in side by side parallel relation, these tanks having concave ends 12 at their fore and aft portions.

In order to attach the prow and stern assemblies to these tanks, metal sleeves 14 and 16 are secured to the fore and aft sections of the tanks 10, respectively, these sleeves embracing the extremities of the tanks as shown in Figures 5 and 6, and being permanently secured thereto as by plug-welding and/or end welding 18, or the like. After the sleeve reinforcing and mounting members 16 and 18 have been secured to the tanks, the internal stresses set up by the welding operation may be stress relieved in a known and conventional manner. These sleeve extensions thus constitute permanent parts of the tank elements and it will be noted that these extensions embrace the extremities of the tanks adjacent the curved or dished end portions 12 thereof.

The prow and stern assemblies indicated generally by the numerals 20 and 22, respectively, are of a generally conical shape, of a construction and for a purpose set forth more fully hereinafter, and are detachably secured to the sleeve extensions 14 and 16 by rivets 24 or in any other desired manner. In some instances it may be found expedient to employ a welded joint. In any event, it is intended that it shall be possible to subsequently remove this joint for purposes of removal or replacement of the prow and stern assemblies.

It is preferred to mount the prow assembly upon the exterior surface of the sleeve 14 at the forward end of the tanks, while the stern assembly 22 is secured to the inner surface of the sleeve 16 extending from the rear of the tanks. It is evident that any desired internal construction could be provided for the prow and stern assemblies, as for example, utilizing the truss assemblies indicated at 26 in conjunction with the transversely disposed bulk head assemblies 28. Since the actual design of the truss and bulk head assemblies is not in itself essential for the purposes of this invention, and may be obtained in accordance with known methods of construction, further explanation regarding the same is believed to be unnecessary.

The foregoing arrangement and method of construction enables the barge to be fabricated in subassemblies, each of which is of such dimensions as to be capable of stress-relieving of its welded joints in existing furnaces. The stress-relieved subassemblies will then be preferably united by non-welded connections which will require no stress-relieving; or if welded will have such joints located remote from the tanks whereby stress-relieving will not be essential.

It is an essential feature and purpose of the foregoing that the prow and stern assemblies may be removable from the tanks in order to facilitate repair or replacement of any of the subassemblies with a minimum expense and loss of time, with a view to increasing the over-all life of the barge.

Reference is now made to Figures 17, 3 and 4 for an illustration and an understanding of the improved manner for rigidly securing the tanks together in side by side relation to form the hull of the barge. At convenient locations upon the exterior surfaces of the tanks 10, there are welded sets of circumferentially extending and radially disposed mounting flanges or brackets 30, there being illustrated four such brackets in a set upon each tank, although obviously any desired number can be employed. It will be readily understood that sets of these brackets may be disposed at suitable longitudinally spaced intervals along the longitudinal extent of each of the tanks. These brackets, after being welded to the tanks may be stress-relieved in accordance with conventional practice as above mentioned. Truss members in the form of metallic plates or the like 32 are disposed between the tanks and are secured to sets of brackets on adjacent surfaces of tanks, as by riveting or the like, as at 34. By this means, the tanks are rigidly connected to each other in side by side but spaced relationship in a manner which will admit of removal of a tank or tanks by removing the rivets 34, to enable servicing or replacement as desired.

The trusses 32 may be notched or recessed as at 36 to receive a longitudinally extending beam 38, or a plurality of such beams, each of which may conveniently comprise an angle iron member. This arrangement will assist in imparting longitudinal rigidity to the truss assembly between the tanks, and will further serve to partially support upper and lower partition plates 40 and 42, respectively, which in turn are riveted as at 44 to mounting brackets 46 likewise welded and stress-relieved as mentioned above upon the exterior surfaces of the tanks.

As set forth in the above mentioned co-pending application of Clarence W. Brandon, the partition members 40 and 42 may define a water-tight tunnel or chamber between the tanks for serving various purposes; or may be apertured to permit the passage of water through the space between the tanks as desired. Since the upper member 40 forms a trough between the sides of the adjacent tanks, water drainage means may be provided in the form of pipes 41 extending from the plate 40 downwardly through the plate 42.

The mounting brackets 30 upon what may be termed the outer sides of the tanks 10 have detachably secured thereto as by the rivets 34 suitable U-shaped frame members 48 having marginal notches 50 therein for receiving in recessed relation longitudinally extending beams 52 which may be of angle iron or L-shaped construction and constitute longitudinal reinforcing and rigidifying members. The outwardly extending assembly of the members 48 with the beams 52 comprises a supporting frame for a longitudinally extending sponson or blister construction consisting of top and bottom plates 54 and 56 together with a side plate 58. The plates 54 and 56 have their edges secured as by rivets 60 to mounting brackets 62 welded to the sides of the tanks 10. Semi-cylindrical longitudinally extending channel members 64 are welded to the exterior surfaces of the plates 58 to provide rub rails or the like for the barge.

As so far described, it will now be apparent that the individual tanks 10 are provided with permanently secured mounting brackets to which are detachably connected truss members for rigidly securing together the series of tanks to form the hull of a barge; whereby the replacement of a tank or other unit in the barge may be effected at a minimum cost and without the necessity for scrapping the entire barge hull. In addition, the fore and aft ends of the tanks are reinforced and strengthened by the sleeve extensions which are permanentaly secured thereto and which serve to removably support the prow and stern assemblies.

As set forth in the above mentioned co-pending applications of Clarence W. Brandon, the tanks 10 serve as containers for volatile liquids which must be maintained under a predetermined temperature and pressure in order to be retained in their liquid phase. Since it is extremely desirable, from the standpoint of maintaining a constant center of gravity of the barge and its cargo, that the tanks 10 shall remain completely filled with liquid, and since by its very nature the volatile liquid is highly expansive under the inflow of heat as from the sun's rays, it is necessary to provide some pressure relieving means such as an expansion chamber.

Figure 2:
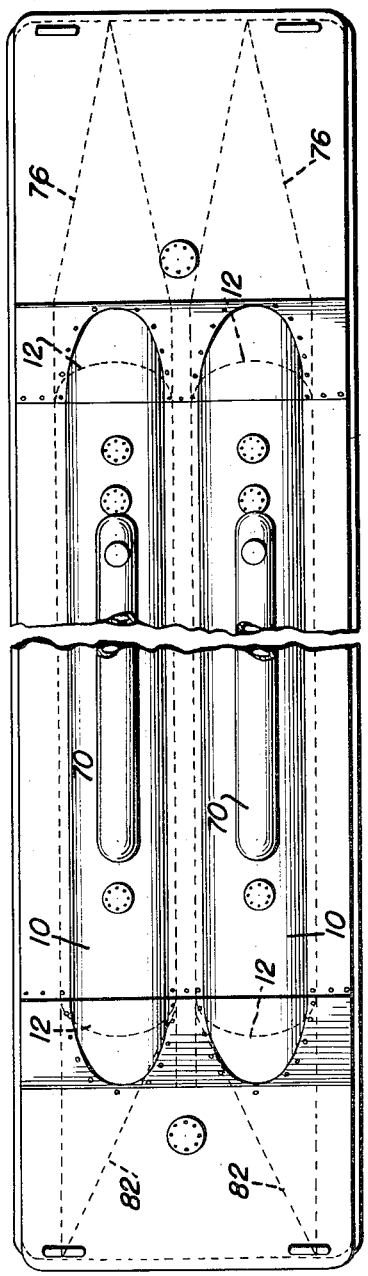
Figure 2 is a top plan view, parts being broken away, of the construction of Figure 1, certain concealed parts being indicated in dotted lines therein.

In accordance with this invention, such expansion means takes the form of an expansion tank 70 of a suitable size and preferably in the form of an elongated cylinder, which is mounted above each of the tanks 10. Thus, as shown in Figures 1 and 2, the tanks 70 may be supported at their forward ends upon cylindrical supports 72 having conduits therein for establishing communication between the interior of the expansion tanks and the interior of the tanks 10. In view of the very considerable length of the expansion tanks 70, there is provided a slidable supporting means for the other end of these tanks which may conveniently comprise supporting standards 74 in the form of plates or the like welded or otherwise fixedly secured to the top surface of the tanks 10, and having seats in their upper edges for slidably receiving and supporting the expansion tanks 70. It will now be apparent that as the tanks 70 longitudinally expand or contract due to a change in temperature of their contents, relative sliding movement of the tanks 70 with respect to their fixed supports 72 is permitted by the sliding and seating engagement of the tanks upon the supporting standards 74.

Figure 12:
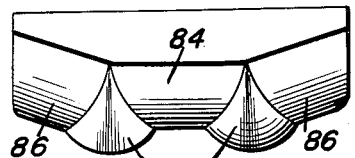

Referring now to the bottom plan view of Figure 7 and the front view of Figure 12, it will be observed that the fore and aft portions of the tanks 10 have substantially conical projections on the undersurface of the prow and stern assemblies. The fore projections 76 may be disposed with their axes at various inclinations with respect to each other, and similarly, the conical aft projections 78 may likewise have their axes at various desired inclinations.

In the arrangement shown in Figures 7 and 12, the conical projections 76 form substantial continuations of the axes of the tanks 10. As will be apparent from Figure 12, the conical projections 76 depend downwardly from the central bottom surface 80 of the prow, while the bottom surface of the prow outwardly from the projections 76 is upwardly inclined as at 82 relative to the surface 80. The forwardly diverging adjacent conical surfaces of the projections 76 serve to direct and guide the water between the two tanks 10, while the upwardly inclined bottom surfaces 82 serve to provide greater clearance for an easier passage of the water below the prow of the barge.

Figure 13:
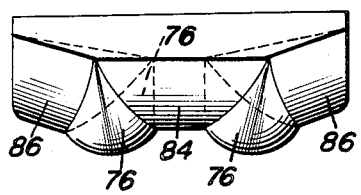
Figure 14:
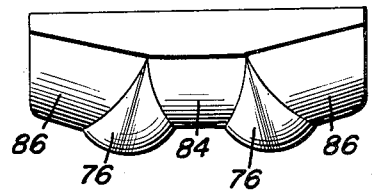
Figure 15:
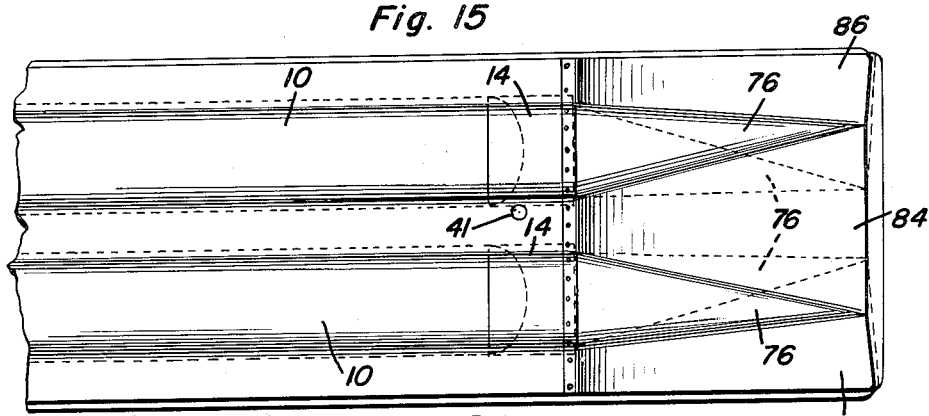
Figure 15 is a bottom plan view of the prow and fore portion of the barge in Figures 1–7, certain modified constructions in accordance with the principles of this invention being indicated in dotted lines thereon.

It will now be evident that if the axes of the conical projections 76 of the prow diverge more sharply outwardly with respect to each other, as shown in Figure 13 when compared with Figure 12, the tendency of the barge to yaw will be increased, while if these axes are brought closer to each other, as shown in Figure 14, or in dotted lines in Figure 15, this tendency will be decreased. It should also be observed that by selecting the proper inclination of the surfaces 82 with respect to the surface 80, that the yawing characteristic of the barge may be varied by adjusting the inclination of the axes of the projections 76, without altering the trim of the prow of the barge. It will be further apparent that by varying the inclination of the surfaces 80 and 82 with respect to each other, as suggested by comparing Figures 11 and 12, that the trim of the barge can be likewise altered for a given inclination or position of the axes of the projections 76 relative to each other.

As shown in Figure 7, the axes of the rearward projection 78 diverge from each other so that the outer elements of the surface of the conical projections form continuations of the elements of the outer cylindrical surface of the tanks 10. This provides a widening of the clearance between the rear projections which produces a vacuum effect or drag upon the barge during its towing or forward travel which increases the stability or steadiness of the steerage of the barge. The bottom surface of the stern assembly between the rearward projection 78 is indicated by the numeral 84, while inclined bottom surfaces 86 extend from the outer sides of the projection 78 toward the sides of the stern, as will be apparent from Figure 10.

In order to increase the effectiveness of the rearward projections, the same are preferably provided with depending fins or skags 88, see also Figure 5, positioned at any suitable angular inclination with respect to the longitudinal axis of the tanks 10, an angle of about 15 degrees being considered to be generally satisfactory.

In the same manner set forth in connection with the prow assembly, the rear conical projections could have their inclination varied and/or the inclination of the surfaces 84 and 86 could likewise be varied to alter the characteristics of performance of the stern assembly. Figure 10 shows in rear elevation the projections of Figure 7 while Figure 9 shows the same arrangement except for disposing all of the surfaces 84 and 86 in the same plane.

Figure 11:
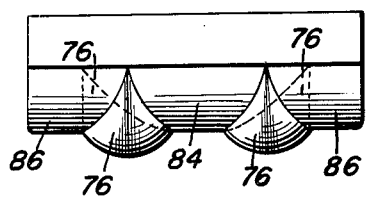
Figures 11–14 are modified constructions, shown in front end elevation, of the prow of the barge.

It will be apparent that if the inclination of the conical projections 78 are varied in either of the arrangements of Figures 9 and 11, the trim of the stern and prow will be varied in addition to effecting variations in the steering and maneuverability of the bare. However, in the arrangements of Figures 10, 12–14 the inclinations of the conical projections can be varied to alter the characteristics of steering and maneuverability without varying the trim by selecting the proper angular relationships between the central and outer surfaces of the bottom surface portions of the prow and/or stern.

As hereinbefore set forth, the barge has been illustrated and described as consisting of two tanks 10. It is evident that three or more such tanks could be provided, and Figures 8 and 16 suggest such an arrangement. Where three or more tanks are employed, the same are secured to each other in exactly the same manner previously described, and the sleeve extensions are applied to the tanks in the same manner above set forth, with the prow and stern assembly secured to the sleeves all as hereinbefore described.

Figure 16:
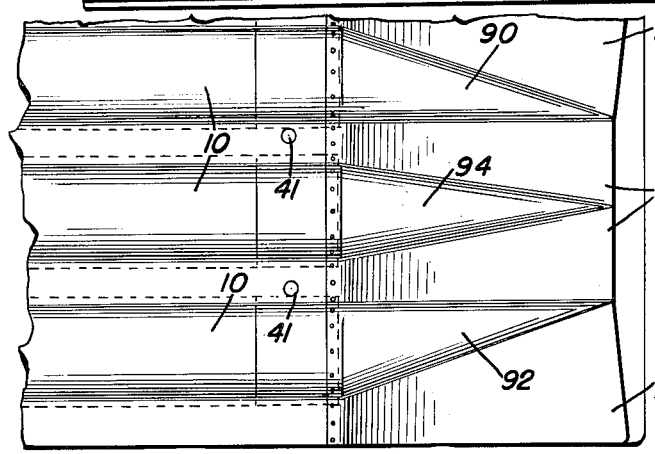
Figure 16 is a bottom plan view of the prow and fore portion of the modified from of barge in Figure 8.

However, in this construction the two outside tanks at their fore ends are provided with the conical projections 90 and 92 which have their adjacent sides in alignment with and forming continuations of the tanks 10, while their outer sides are inclined inwardly as shown in Figure 16. The conical projection 94 of the central tank 10 has its axis in alignment with the axis of the tank 10, so as to be symmetrical therewith. The bottom surfaces of the prow assembly between the two outside conical members 90, 92 and the central member 94 are disposed in the same plane, being indicated by the numeral 96. The outside surfaces of the bottom portion of the prow, indicated by the numerals 98 and 100 are inclined with respect to the surfaces 96 in the same manner set forth previously in connection with the surfaces 80 and 82. As in the preceding construction, the axes of the conical projections could be varied and the inclinations of the surfaces 96, 98 and 100 could be varied in a manner and for the purposes previously set forth.

Likewise in this embodiment, as shown in Figure 8, the aft portions of the tanks 10 are provided with conical projections, indicated at 102 and 104 for the two outside tanks and at 106 for the central tank. The projections 102 and 104 are provided with skags 108 in the manner previously set forth, and the bottom surface of the stern assembly is provided with the portions 110 between the central and the outer projections, which portions lie in the same plane, and the two outer portions 112 and 114 which are inclined with respect to the portions 110.

The outside elements of the exterior surface of the projections 102 and 104 form continuations of the outside elements of the outer tanks 10, while the inside elements of the projections diverge from each other as illustrated and for the same purpose set forth in connection with the preceding embodiment. Similarly, the axis of the central projection 106 forms a continuation of the axis of the central tank 10. As set forth in connection with the preceding embodiment, the inclination of the axes of the projections 102 and 104 could be varied while the inclination of the surfaces 110 with respect to the surfaces 112 and 114 could likewise be varied in the manner and for the same purposes as set forth in connection with the two tank construction.

In the foregoing description, the sleeves 14 and 16 have been considered as permanently secured to the ends of the hull subassembly and removably associated with the prow and stern subassemblies. It will be apparent, however, that the reverse arrangement likewise falls within the principles of this invention and in some instances may be preferable. Thus, the sleeves could be welded to the prow and stern assemblies, and stress-relieved if desired, or could be otherwise attached thereto to form part of those subassemblies. The latter would then be removably secured to the hull section by providing mounting brackets upon the latter, in the same manner as the brackets 30, previously described.

In some instances, it may be possible and may be preferred to stress-relieve the entire hull subassembly as a unit which includes the plurality of tanks with their brackets, trusses and partition plates secured thereto. In other instances, as where rendered necessary by the size of the tanks in comparison with the capacity of available stress-relieving furnaces, the tanks may be stress-relieved individually before they are secured together, after the brackets have been welded in place.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A barge for transporting liquid petroleum comprising, a pair of fluid cargo tanks, a barge end assembly unit extending the full width of the barge and at least the full height of the cargo tanks for coaction with said tanks, means rigidly securing said tanks together in spaced side by side relation in a generally horizontal plane, said unit being disposed for coaction with the water of immersion, a sleeve substantially surrounding and directly secured to each of the mutually adjacent ends at one end of said tanks and projecting beyond the end to which it is secured and being free of bracing from the tanks to constitute tubular girder elements of external diameter greater than that of the end of the tanks, means securing said sleeves to said tanks at circumferentially spaced positions thereon and additional means securing said sleeves to said unit at both the upper and lower portions of the latter, both said securing means jointly coacting to provide increased rigidity of connection of the unit and the tanks, the sleeves comprising substantially the entire support for said unit whereby the latter is mounted upon the tanks.

2. A barge for transporting liquid petroleum comprising a pair of fluid cargo tanks, a pair of barge end assembly units each extending the full width of the barge and at least the full height of the cargo tanks for coaction with said tanks, said units each including upper, lower and side members rigidly joined together and constituting a box girder element, a sleeve substantially surrounding and directly secured to each end of each tank at circumferentially spaced positions thereon and projecting beyond the end to which it is secured and being free of bracing from the tanks to constitute tubular girder elements of external diameter greater than that of the end of the tanks, said upper members being disposed generally tangentially of the upper portion of the sleeves and secured thereto, said lower members including downwardly directed portions secured to said sleeves, thereby rigidifying the connection between the tanks, the sleeves comprising substantially the entire support for said units.

3. A barge for transporting liquid petroleum comprising, a pair of fluid cargo tanks, a barge end assembly unit extending the full width of the barge and at least the full height of the cargo tanks, means rigidly securing said tanks together in spaced side by side relation in a generally horizontal plane, a pair of sleeves each substantially surrounding and directly secured to one of the mutually adjacent ends at one end of said tanks, means securing said sleeves to said tanks at circumferentially spaced positions thereon, each sleeve projecting beyond the end to which it is secured to constitute tubular girder elements of external diameter greater than that of the end of the tank to which it is secured and being free of bracing from the tanks, said unit including joined side and lower members coacting with the water of immersion, said lower member including a pair of conical members coacting with the water of immersion for imparting maneuverability to said barge and each of which has its base portion disposed adjacent a sleeve and having its apex extending outwardly from said sleeve, said conical members merging into said lower member and extending thereunderneath.

4. A barge for transporting liquid petroleum comprising, a pair of fluid cargo tanks, a barge end assembly unit extending the full width of the barge and at least the full height of the cargo tanks, means rigidly securing said tanks together in spaced side by side relation in a generally horizontal plane, a pair of sleeves each substantially surrounding and directly secured to one of the mutually adjacent ends at one end of said tanks, means securing said sleeves to said tanks at circumferentially spaced positions thereon, each sleeve projecting beyond the end to which it is secured to constitute tubular girder elements of external diameter greater than that of the end of the tank to which it is secured and being free of bracing from the tanks, said unit including joined side, upper and lower members, said upper member comprising a deck structure having its inward end substantially tangent with the upper surfaces of said tanks.

5. A barge for transporting liquid petroleum comprising a pair of liquid cargo tanks, means rigidly securing said tanks together in spaced side by side relation in a generally horizontal plane, at least one expansion tank being of a length equal to a major portion of that of a cargo tank disposed in the medial vertical plane of the latter and above said cargo tank, means establishing communication between the expansion tank and said cargo tanks, a stationary support adjacent one end of the expansion tank and supporting the latter upon said cargo tank, a support fixedly mounted upon said cargo tank and slidably engaging and supporting the expansion tank adjacent the other end of the latter whereby upon thermal expansion of the expansion tank the latter may have relative sliding movement upon its fixedly mounted support while being secured to said stationary support.

6. The combination of claim 5 wherein said communicating means includes a conduit disposed within the interior of the fixedly mounted support and connects the cargo tank upon which the fixed support is mounted and the expansion tank to thereby effect overflow and return of fluid from the cargo tank and the expansion tank upon thermal expansion and contraction of the liquid cargo.

7. The combination of claim 5 wherein the expansion tank is disposed substantially intermediate the ends of said storage tank and has its ends terminating in inwardly spaced relation to the ends of the storage tank upon which it is mounted whereby to maintain the trim thereof.

References Cited in the file of this patent

UNITED STATES PATENTS

| 733,583 | Harvey | July 14, 1903 |
| 944,209 | Reed | Dec. 21, 1909 |
| 1,303,690 | Leparmentier | May 13, 1919 |
| 1,770,840 | Claybourn et al. | July 15, 1930 |
| 1,825,613 | Bell | Sept. 29, 1931 |
| 2,055,369 | Warren | Sept. 22, 1936 |
| 2,120,286 | Macdonald | June 14, 1938 |
| 2,217,090 | Zerbe | Oct. 8, 1940 |
| 2,401,453 | Bell et al. | June 4, 1946 |
| 2,539,453 | Marlow et al. | Jan. 30, 1951 |
| 2,600,015 | McLaughlin | June 10, 1952 |

FOREIGN PATENTS

| 10,934 | Great Britain | June 15, 1900 |
| 108,152 | Great Britain | Apr. 13, 1917 |
| 194,238 | Great Britain | Mar. 8, 1923 |
| 226,602 | Great Britain | Dec. 24, 1924 |